United States Patent
Lu et al.

(10) Patent No.: US 9,172,536 B2
(45) Date of Patent: Oct. 27, 2015

(54) AUDIO COMMUNICATION BASED ELECTRONIC SIGNATURE SYSTEM AND METHOD THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 506 days.

(21) Appl. No.: 13/519,783

(22) PCT Filed: Jun. 4, 2012

(86) PCT No.: PCT/CN2012/076416
§ 371 (c)(1),
(2), (4) Date: Jun. 28, 2012

(87) PCT Pub. No.: WO2012/171435
PCT Pub. Date: Dec. 20, 2012

(65) Prior Publication Data
US 2013/0013095 A1    Jan. 10, 2013

(30) Foreign Application Priority Data

Jun. 17, 2011   (CN) .......................... 2011 1 0163450

(51) Int. Cl.
G06F 17/00 (2006.01)
H04L 9/08 (2006.01)
H04L 9/32 (2006.01)

(52) U.S. Cl.
CPC ............ *H04L 9/0877* (2013.01); *H04L 9/3231* (2013.01); *H04L 9/3247* (2013.01)

(58) Field of Classification Search
CPC ....... G06F 21/33; G06F 21/34; G06F 21/445; H04L 2209/56; H04L 2209/805; H04L 9/3273; G06Q 20/4097; G06Q 20/3272; G10L 15/30; G10L 17/24
USPC .......................................................... 700/94
See application file for complete search history.

(56) References Cited

U.S. PATENT DOCUMENTS 5,953,700 A * 9/1999 Kanevsky et al. ......... 704/270.1
7,533,735 B2 * 5/2009 Gantman et al. ............. 173/182
(Continued)

FOREIGN PATENT DOCUMENTS

CN    1655142 A    8/2005
CN    101001146 A  7/2007
(Continued)

OTHER PUBLICATIONS

International Search Report for PCT/CN2012/076416 in Mandarin and the English language translation mailed Sep. 13, 2012.
(Continued)

*Primary Examiner* — Andrew C Flanders
(74) *Attorney, Agent, or Firm* — Harness, Dickey & Pierce, P.L.C.

(57) ABSTRACT

An audio communication based electronic signature system and a method thereof are provided. The system includes: an audio smart key device including an interface module, a data processing module, a smart key module and a power module; and a terminal including an audio output interface, an audio input interface and an application unit. The interface module of the audio smart key device communicates with the terminal in the form of audio signal and it can perform operations of A/D conversion and modulation and demodulation on the audio signal. In the signing method, the terminal sends an audio signal including important data to the smart key device, the audio smart key device receives and decodes the audio signal, demodulates the decoded data and decrypts the demodulated data, signs the decrypted data, encodes, modulates and encrypts the signature result subsequently, sends the crypted result to the terminal, where the encrypted result is sent to the server for signature verification.

19 Claims, 4 Drawing Sheets

(56) References Cited

U.S. PATENT DOCUMENTS

| | | | |
|---|---|---|---|
| 8,406,399 B2 * | 3/2013 | Loveland | 379/201.01 |
| 8,732,793 B2 | 5/2014 | Lu et al. | |
| 2003/0021495 A1 | 1/2003 | Cheng | |
| 2003/0135740 A1 | 7/2003 | Talmor et al. | |
| 2004/0133789 A1 * | 7/2004 | Gantman et al. | 713/189 |
| 2008/0294902 A1 | 11/2008 | Lu et al. | |
| 2009/0187769 A1 | 7/2009 | Camiel | |
| 2011/0246196 A1 * | 10/2011 | Bhaskaran | 704/235 |

FOREIGN PATENT DOCUMENTS

| | | |
|---|---|---|
| CN | 101009562 A | 8/2007 |
| CN | 101013942 A | 8/2007 |
| CN | 101141457 A | 3/2008 |
| CN | 101500231 A | 8/2009 |
| CN | 201846343 U | 5/2011 |
| CN | 102223234 A | 10/2011 |
| JP | 2002297032 A | 10/2002 |

OTHER PUBLICATIONS

International Searching Authority Written Opinion for PCT/CN2012/076416 in Mandarin and the English language translation mailed Sep. 13, 2012.

First Office Action for Chinese Patent Application 201110163450.9 in Mandarin with English language translation provided by Unitalen Attorneys at Law dated Dec. 10, 2012.

* cited by examiner

AUDIO COMMUNICATION BASED ELECTRONIC SIGNATURE SYSTEM AND METHOD THEREOF

CROSS-REFERENCE TO RELATED APPLICATIONS

The present invention is a national stage application of PCT/CN2012/076416, filed Jun. 4, 2012, which claims priority to Chinese Patent Application No. 201110163450.9, titled "Audio Communication Based Electronic Signature System and Method Thereof", filed on Jun. 17, 2011 with the Chinese Patent Office. Both the international application and the Chinese application are incorporated herein by reference in their entireties.

FIELD OF THE INVENTION

The present invention relates to an electronic communication device in the electronic information field, and in particular, to an audio communication based electronic signature system and a method thereof.

BACKGROUND OF THE INVENTION

Development in telephone banking and online banking allows people to enjoy banking services at home. With social development and progress, banking requirements increasingly develop, such as inquiry, transfer, and payment at any time and any location. Both telephone banking and online banking cannot provide customers with desirable services at any time and any location due to some restrictions. The emergence of mobile phone banking leads to another way to provide electronic services to users. As an extension of the online banking, mobile phone banking brings great convenience to users, and therefore, mobile phone banking is expected to be popular with the wide use and technology development of mobile phones.

For the security of electronic transaction, the USB key plays a role of escort with the development of online banking. In mobile phone banking, a device supporting electronic signatures should be provided according to the electronic signature law to sign important electronic data. Traditionally, a SIM card or WAP technology functions as a USB key, or alternatively, a digital signature algorithm and a key is simply stored in a mobile phone. Compared with a USB key used on a computer, the security technologies in the prior art are weak, and therefore, a USB key is needed for mobile devices used for mobile phone banking. For example, some devices communicate data with a computer via a USB interface. Similar functionality can be applied to applications on mobile phones by practicing the solution of the present invention.

SUMMARY OF THE INVENTION

In view of the fact that a mobile phone has a dedicated data interface, it is provided according to embodiments of the present invention an audio communication based electronic signature system and a method therefor in order to apply the security technology widely used in online banking to mobile banking.

The technical solutions according to the embodiments of the present invention are described as follows.

An audio communication based electronic signature system includes an audio smart key device and a terminal, the audio smart key device including an interface module, a data processing module, a smart key module and a power module, in which the interface module is configured to establish a connection with an audio input interface and an audio output interface of the terminal, to receive an audio signal sent by the terminal, to convert the audio signal into a digital signal and send the digital signal to the data processing module, to convert the digital signal into an audio signal and send the audio signal to the terminal, and the interface module is further configured to modulate and demodulate the digital signal;

the data processing module is configured to parse the digital signal from the interface module and send the parsed data to the smart key module, and the data processing module is further configured to package the data from the smart key module to obtain a digital signal and send the digital signal to the interface module;

the smart key module is configured to perform an operation on the data received by the data processing module and send an operation result to the data processing module;

the power module is configured to supply power for the audio smart key device and may be a dry battery or a rechargeable battery;

the terminal includes the audio output interface, the audio input interface and an application unit, in which the audio output interface is configured to output the audio signal generated by the terminal to the audio smart key device;

the audio input interface is configured to receive the audio signal sent to the terminal from the audio smart key device;

the application unit is configured to revoke a multi-media application interface to enable the terminal to access the audio interfaces, and to convert a digital signal to be sent into the audio signal or converting the received audio signal into a digital signal.

The interface module may be of single track or double tracks or a Bluetooth earphone interface. The interface module processes the received audio signal with methods of transformation, rectification and filtering and sends the processed audio signal to the power module; or processes the received audio signal sequentially with methods of transformation with a voltage doubling circuit, rectification and filtering; or processes the received audio signal sequentially with methods of rectification, filtering, DC-DC voltage boosting and filtering and sends the processed audio signal to the power module.

The process of performing the operation includes: signing important data transferred from the data processing module, signing data which needs to be confirmed before signature and has been confirmed by a user, extracting critical information from the important data received from the data processing module and sending the critical information to the output module, and verifying identity data transferred from the data processing module.

The smart key device further includes an input module configured to receive operation information inputted by a user and transfer the operation information to the smart key module. The input module is a single button, a digital key, a photosensitive component, a fingerprinter scanner, a voice operated switch, a body temperature sensor, a pressure sensor, a vibration sensor, an acceleration sensor, a magnetic field sensor or an electric field sensor.

The smart key device further includes an output module configured to receive data from the smart key module and output the data to the user. The output module is a display screen or a voice broadcasting device.

The smart key module includes: a key pair generating unit, a decryption unit, a signing unit and an encryption unit, in which the key pair generating unit is configured to generate a public key and a private key, to send the private key to the encryption unit, and to send the public key to a server;

the decryption unit is configured to receive the public key sent by the server to the audio smart key device and to decrypt a message with the received public key;

the signing unit is configured to sign the decrypted message and to send the signature value to the encryption unit; and the encryption unit is configured to encrypt the signature value with the private key generated by the key pair generating unit and to send the encrypted signature value to the data processing module.

The smart key module includes a message parsing unit configured to process the decrypted message, to extract critical information to be displayed and to send the critical information to the output module.

The smart key device further includes a USB interface configured to: recharge the power module, or, receive and send communication data between the smart key device and the terminal.

An audio communication based electronic signing method includes:

step A: Encoding a first data package to be sent to obtain a first waveform data and accessing an audio interface via an application unit, by a terminal;

step B: Converting the first waveform data into a first audio signal and sending the first audio signal to the audio smart key device, by the terminal;

step C: Receiving the first audio signal and decoding the first audio signal to obtain the first data package, by the audio smart key device;

step D: Unpackaging the first data package to obtain a signature obtaining instruction and extracting important data message from the signature obtaining instruction, by the audio smart key device;

step E: Signing, by the audio smart key device, the important data message;

step F: Packaging, by the audio smart key device, a signature result to form a second data package;

step G: Encoding the second data package to obtain a second waveform data, converting the second waveform data into a second audio signal and sending the second audio signal to the terminal, by the audio smart key device; and step H: Receiving the second audio signal, sampling the second audio signal to obtain the second waveform data and decoding the second waveform data to obtain the signature result, by the terminal.

The step A includes: encoding, by the terminal, the first data package to be sent to obtain the first waveform data with a predetermined encoding method via the application unit; transferring, by the terminal, the first waveform data to a multi-media application interface in the application unit on a terminal operation system; and revoking, by the multi-media application interface, a low-layer hardware driver to access the audio interface.

There is a predetermined low level or high level at the beginning of the first waveform data in step A.

The first data package to be sent in step A is a base-band digital signal including instruction and message packaged with a private protocol, and where the instruction includes a signature obtaining instruction and a personal identification number verifying instruction; and the first waveform data is obtained by encoding the base-band digital signal with a predetermined encoding method, or by modulating and encoding the base-band digital signal with a predetermined encoding method.

The first data package and the second data package are encrypted data packages, or, data in the first data package and the second data package are encrypted data. The first data package and the second data package include verification values of the data.

The encoding process is implemented with a rule of "0" referring to "00" and "1" referring to "FF" or a rule of "00" referring to "00", "01" referring to "3F", "10" referring to "7F", and "11" referring to "FF".

The step A includes: encoding the first data package to obtain a base-band signal waveform applicable to channel transfer and encoding the base-band signal waveform to obtain the first waveform data with a predetermined encoding method.

The process of encoding the first data package to obtain the base-band signal waveform applicable to channel transfer may be implemented as follows: the first data package is encoded to obtain the base-band signal waveform applicable to channel transfer with Hamming code; or, the first data package is encoded to obtain the base-band signal waveform applicable to channel transfer with an encoding rule of "1" referring to two-bit "11" and "00" alternatively and "0" referring to two-bit "01" constantly, or an encoding rule of "0" referring to a two-bit code "01" and "1" referring to two-bit "10"; or, the first data package is converted into a unipolar non-return-to-zero waveform, a bipolar non-return-to-zero waveform, a unipolar return-to-zero waveform, a bipolar return-to-zero waveform, or a differential waveform.

Before the process of encoding the base-band signal waveform to obtain the first waveform data with a predetermined encoding method, the base-band signal waveform is modulated by amplitude shift keying, frequency-shift keying or phase shift keying.

The first audio signal in step B is an audio signal with a low-to-high transition or a high-to-low transition.

The step C includes: receiving the first audio signal, recovering the first waveform data from the first audio signal, decoding the first waveform data to obtain the first data package and sending the first data package to the data processing module, by an interface module of the audio smart key device. The first waveform data is decoded to obtain the first data package with a rule of "00" referring to "0" and "FF" referring to "1".

Alternatively, the step C may include: receiving the first audio signal, recovering the first waveform data from the first audio signal, demodulating the first waveform data, decoding the demodulated first waveform data to obtain the first data package and sending the first data package to the data processing module, by the interface module of the audio smart key device.

The step D includes: receiving and unpackaging the first data package to obtain a signature obtaining instruction and a verification value, and extracting an important data message from the signature obtaining instruction, by the data processing module of the audio smart key device; computing a verification value from data in the received first data package with a predetermined algorithm and comparing the computed verification value with the verification value from unpackaging, by the data processing module; if a match is found, determining that the received data is correct and sending the important data message to the smart key module, by the data processing module; or if a match is not found, determining that the received data is incorrect and returning an error to the terminal, by the audio smart key device.

The step D further includes: unpackaging the first data package by the data processing module of the audio smart key device to obtain a personal identification number verifying instruction, sending by the data processing module the personal identification number verifying instruction to the smart key module, verifying by the smart key module whether the personal identification number is correct and sending a verification result to the data processing module.

In step E, the signing process includes: signing the important data message as a whole, or, extracting and signing a part of the important data message.

The present invention can bring the following advantages: the security of online transaction of the terminal can be ensured with the electronic signature system and method thereof according to embodiments of the present invention, and the signing method can be widely applied in terminals with an audio interface due to the audio communication.

DETAILED DESCRIPTION OF THE INVENTION

For making the object, solution, and advantages of the present invention clear, the following description is detailed with reference to the drawings.

First Embodiment

An audio communication based electronic signature system includes an audio smart key device and a terminal. The audio smart key device includes an interface module, a data processing module, a smart key module and a power module. The terminal includes an audio output interface, an audio input interface and an application unit. The audio smart key device and the terminal perform digital signature with audio data transferring method.

The audio smart key device may further include an input module. The audio smart key device receives operation confirming information from a user and performs digital signature during the digital signature process.

Alternatively, the audio smart key device may further include an input module and an output module. The audio smart key device determines whether a signature is needed according to received operation confirming information inputted by a user after his recheck during the digital signature process.

Figure 1:
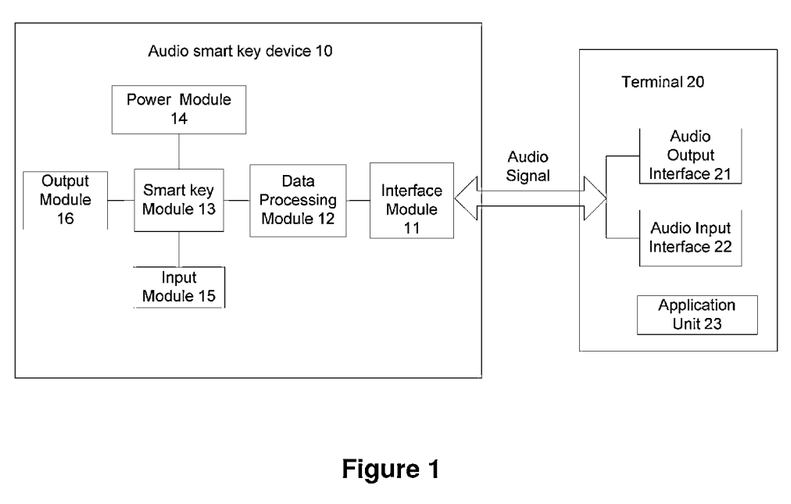
FIG. 1 is a structural diagram of an audio communication based electronic signature system according to a first embodiment of the present invention.

As illustrated in FIG. 1, an audio communication based electronic signature system is provided. The signature system includes an audio smart key device 10 and a terminal 20.

The audio smart key device 10 includes an interface module 11, a data processing module 12, a smart key module 13, a power module 14, an input module 15 and an output module 16. Functions of the respective modules are set forth hereinafter.

The interface module 11 is configured to establish a connection with an audio Input/Output (I/O) interface of the terminal 20 via an earphone line or a Bluetooth earphone interface, to receive an audio signal sent by the terminal 20 and convert the audio signal into a digital signal which is then sent to the data-processing module 12, and to convert a digital signal into an audio signal and send the converted audio signal to the terminal. The interface module 11 is further configured to modulate and demodulate the digital signal.

The data processing module 12 is configured to parse the digital signal transferred from the interface module 11 and send the parsed data to the smart key module 13, and to package data transferred from the smart key module 13 to form a digital signal and send the digital signal to the interface module 11.

The smart key module 13 is configured to perform an operation on the data received from the data processing module 12, and send an operation result to the data processing module 12. Specifically, the smart key module 13 signs important data transferred from the data processing module 12 or signs data which needs to be confirmed before signature and has been confirmed by a user. The smart key module 13 is further configured to extract critical information from the important data received from the data processing module 12 and send the critical information to the output module 16, and to verify identity data transferred from the data processing module 12.

The power module 14 is configured to supply power for the audio smart key device via an internal battery or an external power supply. Alternatively, the power module 14 may obtain power from the terminal 20 via the interface module 11 for power supply. The power module 14 may be a dry battery or a rechargeable battery.

The input module 15 is configured to receive confirmation information inputted by the user and transfer the confirmation information to the smart key module 13. The input module 15 may be a single button, a digital key, a photosensitive apparatus, a fingerprint scanner, a voice operated switch, a body temperature sensor, a pressure sensor, a vibration sensor, an acceleration sensor, a magnetic field sensor or an electric field sensor.

The output module 16 is configured to receive data from the smart key module 13 and output the same to the user. The output module 16 may be a display screen or a voice player. Specifically, the output module 16 may be a liquid crystal screen or an organic semiconductor luminescent screen.

The interface module 11 may be of single track or double tracks. In the case of single track, the audio smart key device 10 receives audio signal sent from the terminal 20 via the single track, and the interface module 11 sends the received audio signal to the power module 14 for power supply and to the data processing module 13 for processing. In the case of double track, the audio smart key device 10 receives the audio signal sent from the terminal 20 via the double tracks, where one track is configured to receive the audio signal, recover a data package included in the audio signal and send the same to the data processing module 13, and the other track is configured to receive the audio signal for power supply.

Preferably, the interface module 11 is configured to process the received audio signal with one of the following three methods: transformation, rectification and filtering; rectification, filtering, DC-DC voltage boosting; and transformation with a voltage doubling circuit, rectification and filtering; and to send the processed audio signal to the power module 14 via the single track or double tracks for power supply, which avoids independent power supply and saves power. Alternatively, the audio smart key device may get power supply from an internal battery or an external power supply.

Alternatively, the interface module 11 may be a Bluetooth earphone interface which is configured to receive communication data sent by the terminal 20 via a Bluetooth earphone.

The interface module 11 may further include a modulation and demodulation circuit, and in the case of a long-distance communication with the terminal, the interface module 11 demodulates the received signal and sends the demodulated signal to the data processing module 12, or demodulates the data to be sent and sends the demodulated data to the terminal 20. Alternatively, the modulation and demodulation function is implemented by a modulation and demodulation software in the interface module.

In the case of a short-distance communication with the terminal 20, the interface module 11 directly converts the digital signal into a base-band audio signal and sends the base-band audio signal to the terminal 20, or, receives base-band audio signal sent by the terminal and converts the same to the digital signal.

The interface module 11 may further include a rectifier and filter circuit for performing operation of voltage transformation, rectification and filtering on the received audio signal.

The smart key module 13 includes a key pair generating unit, a decryption unit, a message parsing unit, a signing unit, and an encryption unit.

The key pair generating unit is configured to generate a public key and a private key, to send the private key to the encryption unit, and to send the public key to a server.

The decryption unit is configured to receive the public key sent by the server to the audio smart key device and to decrypt a message with the received public key.

The message parsing unit is configured to process the decrypted message, to extract critical information to be displayed, and to send the same to the output module.

The signing unit is configured to sign the decrypted message and to send the signature value to the encryption unit.

The encryption unit is configured to encrypt the signature value with the private key generated by the key pair generating unit and to send the encrypted signature value to the data processing module.

The audio smart key device may further include a USB interface configured to recharge the power module or supply power to the device in the case of being connected with a computer, and to connect with the terminal as a common USB key for data communicate with the terminal.

The terminal 20 includes an audio output interface 21, an audio input interface 22 and an application unit 23.

The audio output interface 21 is configured to output the audio signal generated at the terminal to the audio smart key device.

The audio input interface 22 is configured to receive the audio signal sent from the audio smart key device to the terminal.

The application unit 23 is configured to revoke a multimedia Application Interface (API) to enable the terminal to access its audio interfaces and to convert the important data message into an audio signal or convert the received audio signal into a digital signal.

The interface module 11 of the audio smart key device 10 is connected to the audio output interface 21 and the audio input interface 22 of the terminal 20. In the case that the interface module 11 is a Bluetooth earphone interface, the audio output interface 21 of the terminal 20 sends audio signals via a Bluetooth interface. In the case that the audio input interface 22 of the terminal 20 is a Bluetooth earphone interface, the interface module 11 sends audio signals via a Bluetooth interface.

In the case of a short-distance data transfer, the transfer channel is of low-pass feature, and the digital base-band signals between the audio smart key device and the terminal can be directly transferred.

In the case of a long-distance data transfer, the transferred base-band signals have a lower frequency component and thus a carrier is need to carry the base-band signals at the sender of the communication, i.e., one or more parameters of the carrier signal are changed with the base-band signal, and the process is named modulation. In this case, a modulation and demodulation software is installed in the terminal and a modulator and demodulator may be added in the interface module of the audio smart key device to implement the functions of modulation and demodulation.

Second Embodiment

Figure 2:
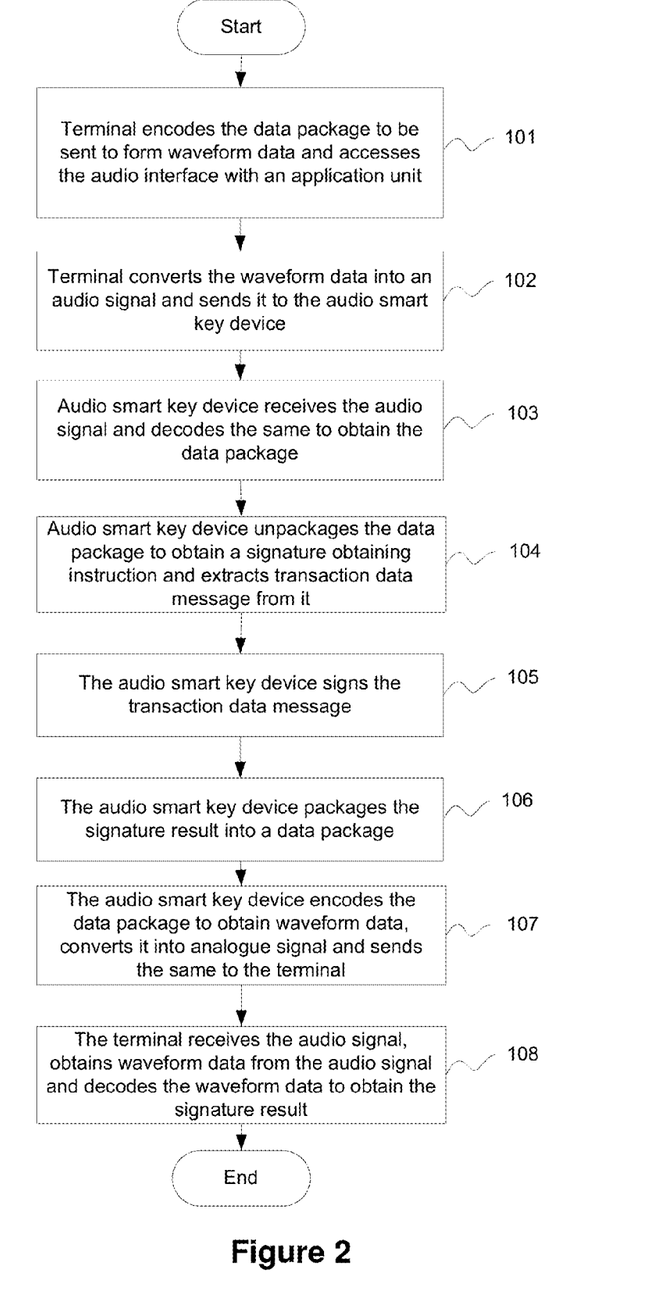
FIG. 2 is a flow chart of an audio communication based electronic signing method according to a second embodiment of the present invention.

An audio communication based electronic signing method corresponding to the system of the first embodiment is illustrated in FIG. 2, including steps 101 to 108 as follows.

In step 101, the terminal encodes a data package to be sent to form waveform data, and accesses the audio interface via the application unit. Further, limited bits of low levels or high levels may be added at the beginning of the waveform data, where the low or high level is determined relative to the amplitude of the waveform of the waveform data encoded from the data package to be sent.

Specifically, in the process of the terminal encoding the data package to be sent to form the waveform data and accessing the audio interface via the application unit, the server sends the data package to the terminal, the terminal encodes the data package to be sent to form waveform data according to a predetermined encoding method and transfers the waveform data to a multi-media Application Interface (API) of the application unit on a terminal operation system, and the API revokes a low-layer hardware driver to access the audio interface.

The data package to be sent is a base-band digital signal including an instruction and a message, packaged with a private protocol, which are binary codes consisted of "0" and "1", where the instructions may be a signature obtaining instruction or a Personal Identification Number (PIN) verifying instruction. The waveform data may be obtained by directly encoding the base-band digital signal or by modulating and encoding the base-band digital signal.

Preferably, the terminal sends encrypted content to the smart key device, which means that the data package sent by the terminal is an encrypted result. Specifically, the encrypted result may be implemented by encrypting the data package, or, by encrypting the data to be sent and packaging the encrypted data to form the data package.

Preferably, in the case that the data to be sent is packaged with a private protocol, a verification value may be added to the data to be sent. For example, if an XOR operation is performed on the data "01 55 68" to be sent is packaged, a verification value "3C" is generated and added to the data package, and the format of the packaged data package is "02 03 01 55 68 3C".

In the embodiment, the terminal may encode the base-band digital signal to form waveform data with a predetermined encoding method. For example, the terminal outputs a variety of voltages ranging from 0 to 300 mV, corresponding to a 8-bit binary code from "00" to "FF", and the base-band signal code is encoded with a rule of "0" referring to "00" and "1" referring to "FF". For example, the waveform data "FF 00 FF 00 FF 00" is obtained by encoding a base-band digital signal "101010". Or, the base-band digital signal is encoded with a rule of "00" referring to "00", "01" referring to "3F", "10" referring to "7F", and "11" referring to "FF". For example, waveform data "7F 7F 3F FF" is obtained by encoding a base-band digital signal "10100111".

Preferably, the terminal may encode the base-band digital signal as a base-band signal waveform applicable to channel transfer, and further encode the base-band signal waveform as waveform data with a predetermined encoding method. For example, the predetermined encoding method may be of "0" referring to "00", "1" referring to "FF", or more codes referring to one 8-bit Hexadecimal number, such as "101" referring to "EF" or "1111" referring to "FF". The encoding of the base-band digital signal as a base-band signal waveform applicable to channel transfer may be implemented with the following methods.

Hamming Code is a kind of code for correcting one bit error. Preferably, the base-band digital signal may be encoded with Hamming code and then processed to form waveform data according to a predetermined encoding method, which can improve encoding efficiency and ensure correction of data transfer.

Preferably, the terminal may encode the base-band digital signal with an encoding rule of "1" referring to two-bit code "11" and "00" alternatively and "0" referring to "01" constantly, or an encoding rule of "0" referring to a two-bit code "01" and "1" referring to two-bit code "10". For example, a transfer code "110100011101" or "100110011001" is obtained by encoding the base-band digital signal "101010" with the above encoding rule.

Figure 3:
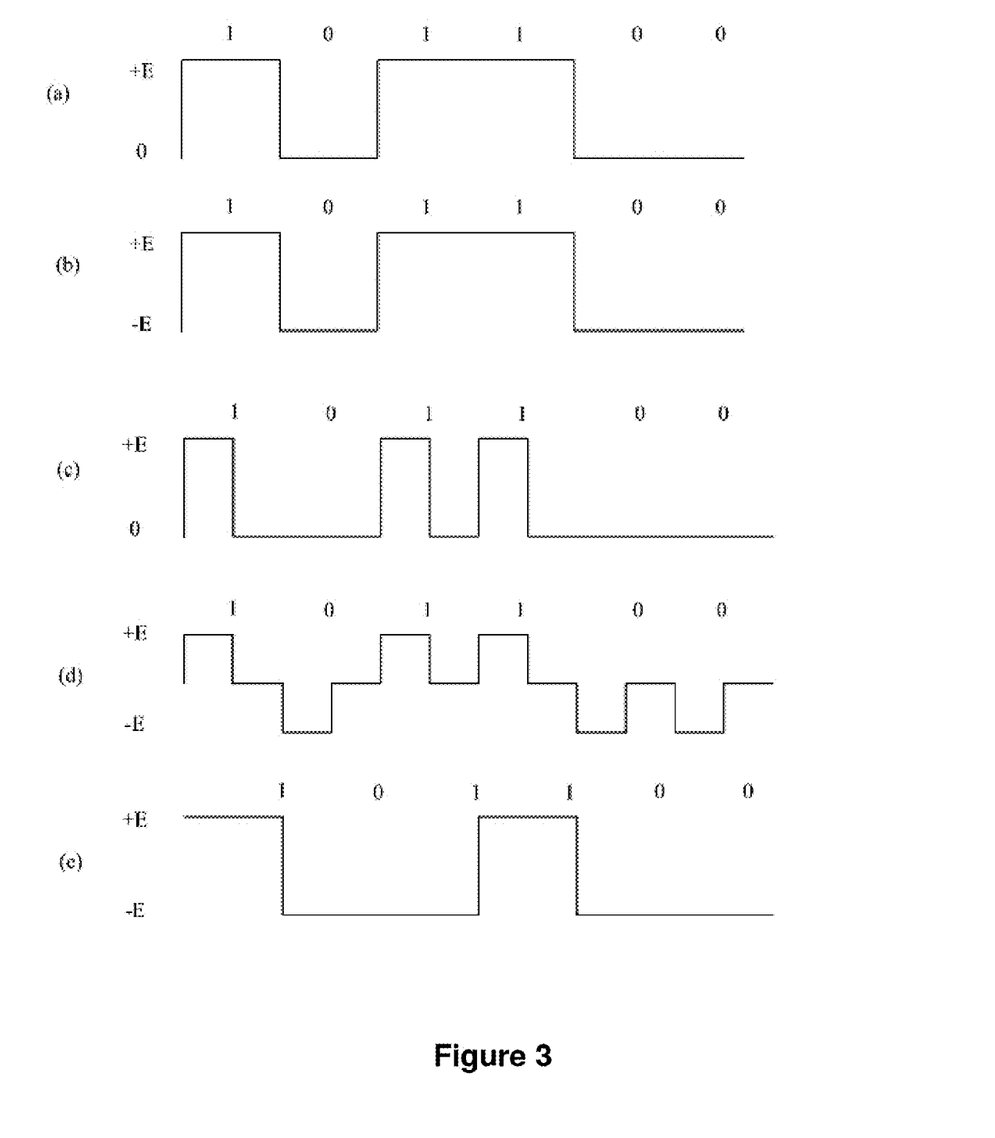
FIG. 3(a) illustrates a waveform of a base-band digital signal "10110" after being encoded.
FIG. 3(b) illustrates a waveform of the base-band digital signal "10110" after being encoded.
FIG. 3(c) illustrates a unipolar return-to-zero waveform which is obtained by converting the base-band digital signal to be sent.
FIG. 3(d) illustrates a bipolar return-to-zero waveform which is obtained by converting the base-band digital signal to be sent.
FIG. 3(e) illustrates a waveform of the base-band digital signal "10110" after being encoded.

The terminal may convert the base-band digital signal to be sent into a unipolar non-return-to-zero (NRZ) waveform by referring a zero level and a positive level of the signal pulse respectively to binary codes "0" and "1", for example, the base-band digital signal "10110" is encoded as a waveform as illustrated in FIG. 3(a). Or, the terminal may convert the base-band digital signal to be sent into a bipolar non-return-to-zero waveform by referring a positive level and a negative level of the signal respectively to binary codes "1" and "0", for example, the base-band digital signal "10110" is encoded as a waveform as illustrated in FIG. 3(b). Or, the terminal may convert the base-band digital signal to be sent into a unipolar return-to-zero waveform as illustrated in FIG. 3(c) or a bipolar return-to-zero waveform as illustrated in FIG. 3(d). Or, the terminal may convert the base-band digital signal to be sent into a differential waveform by referring level transition to "1" and level non-transition to "0" or by referring level transition to "0" and level non-transition to "1", for example, the base-band digital signal "10110" is encoded as a waveform as illustrated in FIG. 3(e).

Figure 4:
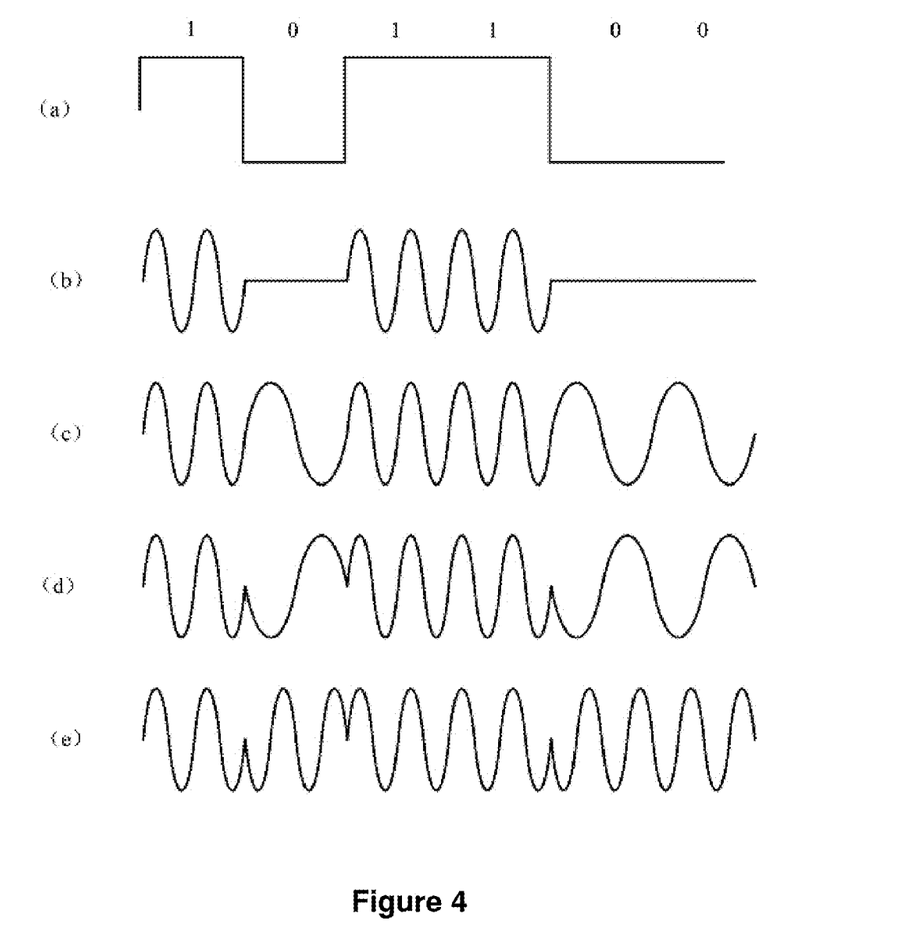
FIG. 4(a) illustrates a binary base-band signal "10110"
FIG. 4(b) illustrates a waveform of the binary base-band signal after being modulated by 2ASK.
FIG. 4(c) illustrates a waveform of a phase-continuous 2FSK modulated signal.
FIG. 4(d) illustrates a waveform of a phase-discontinuous 2FSK signal.
FIG. 4(e) illustrates a waveform by 2PSK modulation.

In the embodiment, the terminal may further modulate the encoded base-band digital signal into waveform data. There are three methods for modulating a base-band digital signal: Amplitude Shift Keying (ASK), Frequency-shift keying (FSK) or Phase Shift Keying (PSK), which carries analogue signal by using amplitude, frequency and phase respectively. Taking binary keying as an example, the binary base-band signal is "10110" as illustrated in FIG. 4(a), if the carrier is a sine wave, the binary base-band signal is modulated by 2ASK as a waveform as illustrated in FIG. 4(b), or is modulated by 2FSK as waveform as illustrated in FIG. 4(c) which illustrates a phase-continuous 2FSK signal and FIG. 4(d) which illustrates a phase-discontinuous 2FSK signal, and FIG. 4(e) illustrates a waveform by 2PSK modulation. Waveform data can be obtained by sampling the above waveform drawings.

In step 102, the terminal converts the waveform data into an audio signal and sends the same to the audio smart key device. Further, the audio signal sent is an audio signal with a high-to-low or low-to-high transition, and the location of transition indicates that the terminal begins to send the data package.

Alternatively, the terminal may send an alternating current signal at a specific frequency to the audio smart key device via the audio output interface, and the audio smart key device processes the received alternating current signal with methods of transformation, rectification and filtering to supply power for the device or with methods of rectification, filtering, DC-AC voltage boosting, filtering or with methods of transformation with voltage doubling circuit, rectification and filtering to supply power for the device.

In step 103, the audio smart key device receives the audio signal and decodes the audio signal to obtain the data package.

Specifically, the interface module of the audio smart key device receives the audio signal, recovers the waveform data from the audio signal, decodes the waveform data to obtain the data package, and sends the data package to the data processing module.

The process of decoding the audio signal to obtain the data package is a reverse process of encoding the data package to obtain the waveform data in step 102 and converting the waveform data into the audio signal in step 103. For example, due to inevitable errors in the audio signal after many conversions, the waveform data recovered from the audio signal received is "EF 01 EF 01 EF 01", in which "EF" approximately equals to "FF", "01" to "00", and thus the data package recovered from the waveform data includes data to be sent "101010" with the rule of "00" referring to "0" and "FF" referring to "1". Further, if the waveform data is obtained by modulation and sampling, the audio smart device demodulates the received audio signal to recover the data package with methods of frequency demodulating, amplifier demodulating, or phase demodulating.

In step 103, the data package recovered from the received audio signal, after the audio smart key device detects the transition of a rising edge or a falling edge, is the data package including the data sent by the terminal.

In step 104, the audio smart key device unpackages the data package to obtain a signature obtaining instruction and extracts important data message therefrom.

Specifically, the data processing module of the audio smart key device receives and unpackages the data package to obtain the signature obtaining instruction, extracts the important data message therefrom and sends the same to the smart key module. Further, if the data package received by the data processing module includes a verification value, the data processing module computes a verification value from data in the received data package according to a predetermined algorithm and compares the computed verification value with the verification value included in the received data, and if a match is found, it is determined that the received data is correct;

otherwise, it is determined that the received data is incorrect and the audio smart key device returns an error to the terminal.

The data processing module unpackages the received data package. If an unpackaged result is a PIN verifying instruction, the smart key module verifies whether the PIN is correct and sends the verification result to the data processing module.

Preferably, if the received data package is an encrypted data package, the data processing module decrypts and unpackages the received data package. If the data processing module unpackages the data package to obtain encrypted data, the smart key module decrypts the received data.

In step 105, the audio smart key device signs the important data message.

Specifically, the smart key module of the audio smart key device signs the received important data message and sends a signature result to the data processing module; or, the smart key module signs only a part of the important data message, for example, extracts critical content from the important data message and computes a message of the critical content.

If the audio smart key device includes an input module, the process of whether to sign the received important data message further includes the process of confirmation from a user. In this case, the smart key module receiving and signing the important data message may be specifically implemented as follows: the smart key module receives the important data message, waits for receiving confirmation information inputted by a user, signs the important data message upon receiving the confirmation information from the user, and sends a signature result or a signature cancelling instruction to the data processing module, or sends an overtime cancelling instruction to the data processing module upon not receiving confirmation information from the user during a predetermined period of time.

If the audio smart key device includes an input module and an output module, the process of signing the received important data message further includes the processes of rechecking and confirming the important data information by the user. In this case, the smart key module receiving and signing the important data message may be specifically implemented as follows: The smart key module parses the received important data message to obtain the important data information, sends the important data information to the output module, waits for the user to input operation information, determines whether it is necessary to sign the important data message according to the received operation information inputted by the user, and sends a signature result or a signature cancelling instruction to the data processing module, or sends an overtime cancelling instruction to the data processing module upon not receiving the operation information inputted by the user during a predetermined period of time.

For example, the input module is a key and the output module is an LCD. If the parsed result is important data information, the smart key module may further extract critical information from the important data information and sends the same to the LCD for display, and if the user inputs confirmation information on what is displayed on the LCD via the key, the smart key module determines whether to sign the important data message according to the received confirmation information inputted by the user, and sends the signature result or the signature cancelling instruction to the data processing module.

For example, the important data message is a message in XML format and is parsed as below.
 <?xml version="1.0" encoding="UTF-8"?><T><D><M><k>Name of payee: </k><v>Zhang San</v></M><M><k>Amount: </k><v>123.23</v></M></D><E><M><k>Swift number: </k><v>12345678</v></M></E></T>

The important data information "Name of payee: Zhang San, Amount: 123.23" is parsed and extracted from the above codes.

In step 106, the audio smart key device packages the signature result to form a data package.

Specifically, the data processing module of the audio smart key device packages the signature result to form a data package and sends the data package to the interface module.

For example, the data processing module of the audio smart key device encrypts the signature result, packages the encrypted signature result to form a data package and sends the data package to the interface module; or, packages the signature result to form a data package, encrypts the data package and sends the same to the interface module.

Upon receiving the signature cancelling instruction or the overtime cancelling instruction, the data processing module packages the instruction and sends the packaged instruction to the interface module according to the private protocol.

Preferably, the packaging of the data to be sent may further include adding a verification value to the data.

In step 107, the audio smart key device encodes the data package to obtain waveform data, converts the waveform data into an audio signal and sends the audio signal to the terminal.

Specifically, the interface module of the audio smart key device receives the data package including the signature result, encodes the same to obtain waveform data with a predetermined encoding method, converts the waveform data into an audio signal and sends the audio signal to the terminal.

The interface module encodes the received data package including the signature cancelling instruction or the overtime cancelling instruction, to obtain waveform data and converts the waveform data into an audio signal and sends the audio signal to the terminal.

The process of encoding the data package to obtain the waveform data may be implemented with the encoding method in step 101, in which the data package is encoded to obtain a base-band signal waveform, the base-band signal waveform is converted into an audio signal or is modulated and converted into an audio signal, which is then sent to the terminal.

In the embodiment, the audio smart key device may send the audio signal to the terminal via a bluetooth earphone interface, and correspondingly, the terminal receives the audio signal in bluetooth mode. Or, the terminal sends the audio signal via a bluetooth earphone interface and the audio smart key device receives the audio signal in bluetooth mode.

In step 108, the terminal receives the audio signal, samples the same to obtain the waveform data and decodes the waveform data to obtain the signature result.

Specifically, the terminal receives the audio signal via the audio input interface and converts the same into waveform data, and transfers the waveform data to the application unit; the application unit of the terminal receives the waveform data, decodes the waveform data to obtain the signature result according to a predetermined decoding method and sends the signature result to the server. The process of decoding the waveform data to obtain the signature result according to the predetermined decoding method may be implemented with the method of decoding the data package in step 103.

The application unit recovers the received waveform data to obtain the signature cancelling instruction or the overtime cancelling instruction and sends the same to the server.

The server performs transaction according to the received signature result and the instruction.

The aforesaid are just preferred embodiments of the present invention, not a limit to the present invention, and all modifications, substitutes, improvement and etc., within the principle and spirit of the present invention should fall in the protection scope of the present invention.

The invention claimed is:

1. An audio communication based electronic signature system, comprising an audio smart key device and a terminal, the audio smart key device comprising an interface module, a data processing module, a smart key module, a key pair generating unit, and a power module, wherein:

the interface module is configured to establish a connection with an audio input interface and an audio output interface of the terminal, to receive an audio signal sent by the terminal, to convert the audio signal into a digital signal and send the digital signal to the data processing module, to convert the digital signal into an audio signal and send the audio signal to the terminal, and the interface module is further configured to modulate and demodulate the digital signal;

the data processing module is configured to parse the digital signal from the interface module and send the parsed data to the smart key module, and the data processing module is further configured to package the data from the smart key module to obtain a digital signal and send the digital signal to the interface module;

the smart key module is configured to perform an operation on the data received by the data processing module and send an operation result to the data processing module;

the power module is configured to supply power for the audio smart key device;

the terminal comprises the audio output interface, the audio input interface and an application unit, the audio output interface is configured to output the audio signal generated by the terminal to the audio smart key device;

the audio input interface is configured to receive the audio signal sent to the terminal from the audio smart key device;

the application unit is configured to revoke a multi-media application interface to enable the terminal to access the audio interfaces, and to convert a digital signal to be sent into the audio signal or convert the received audio signal into a digital signal, the smart key module includes: a decryption unit, a signing unit, and an encryption unit the decryption unit is configured to decrypt a message, the message being included in the parsed data received from the data processing module;

the signing unit is configured to sign the decrypted message to obtain a signature value and to send the signature value to the encryption unit;

the encryption unit is configured to encrypt the signature value and to send the encrypted signature value to the data processing module;

the key pair generating unit is configured to generate a public key and a private key, to send the private key to the encryption unit, and to send the public key to a server;

the decryption unit is further configured to receive the public key sent by the server to the audio smart key device and to decrypt a message with the received public key; and the encryption unit is further configured to encrypt the signature value with the private key generated by the key pair generating unit and to send the encrypted signature value to the data processing module.

2. An audio communication based electronic signature system, comprising an audio smart key device and a terminal, the audio smart key device comprising an interface module, a data processing module, a smart key module and a power module, wherein:

the interface module is configured to establish a connection with an audio input interface and an audio output interface of the terminal, to receive an audio signal sent by the terminal, to convert the audio signal into a digital signal and send the digital signal to the data processing module, to convert the digital signal into an audio signal and send the audio signal to the terminal, and the interface module is further configured to modulate and demodulate the digital signal;

the data processing module is configured to parse the digital signal from the interface module and send the parsed data to the smart key module, and the data processing module is further configured to package the data from the smart key module to obtain a digital signal and send the digital signal to the interface module;

the smart key module is configured to perform an operation on the data received by the data processing module and send an operation result to the data processing module;

the power module is configured to supply power for the audio smart key device;

the terminal comprises the audio output interface, the audio input interface and an application unit, the audio output interface is configured to output the audio signal generated by the terminal to the audio smart key device;

the audio input interface is configured to receive the audio signal sent to the terminal from the audio smart key device;

the application unit is configured to revoke a multi-media application interface to enable the terminal to access the audio interfaces, and to convert a digital signal to be sent into the audio signal or convert the received audio signal into a digital signal, the smart key module includes: a decryption unit, a signing unit, and an encryption unit the decryption unit is configured to decrypt a message, the message being included in the parsed data received from the data processing module;

the signing unit is configured to sign the decrypted message to obtain a signature value and to send the signature value to the encryption unit;

the encryption unit is configured to encrypt the signature value and to send the encrypted signature value to the data processing module; and the interface module is further configured to:

process the received audio signal with methods of transformation, rectification and filtering and send the processed audio signal to the power module; or process the received audio signal sequentially with methods of transformation with a voltage doubling circuit, rectification and filtering; or process the received audio signal with methods of rectification, filtering, DC-DC voltage boosting and filtering and send the processed audio signal to the power module.

3. The electronic signature system of claim 1, wherein the smart key device further comprises: an input module configured to receive operation information inputted by a user and transfer the operation information to the smart key module, and an output module configured to receive data from the smart key module and output the data to the user.

4. The electronic signature system of claim 3, wherein the smart key module comprises a message parsing unit configured to process the decrypted message, to extract critical information to be displayed and to send the critical information to the output module.

5. The electronic signature system of claim 1, wherein the smart key device further comprises a USB interface configured to: recharge the power module, or, receive and send communication data between the smart key device and the terminal.

6. An audio communication based electronic signing method, comprising:
step A: Encoding a first data package to be sent to obtain a first waveform data and accessing an audio interface via an application unit, by a terminal;
step B: Converting the first waveform data into a first audio signal and sending the first audio signal to an audio smart key device, by the terminal;
step C: Receiving the first audio signal and decoding the first audio signal to obtain the first data package, by the audio smart key device;
step D: Unpackaging the first data package to obtain a signature obtaining instruction and extracting important data message from the signature obtaining instruction, by the audio smart key device;
step E: Signing, by the audio smart key device, the important data message;
step F: Packaging, by the audio smart key device, a signature result to form a second data package;
step G: Encoding the second data package to obtain a second waveform data, converting the second waveform data into a second audio signal and sending the second audio signal to the terminal, by the audio smart key device; and
step H: Receiving the second audio signal, sampling the second audio signal to obtain the second waveform data and decoding the second waveform data to obtain the signature result, by the terminal;
wherein the audio smart key device generates a public key and a private key, sends the public key to a server, receives the public key sent by the server and the audio smart key device decrypts the first data package with the received public key, and the audio smart key device encrypts the signature result with the private key.

7. The electronic signing method of claim 6, wherein the step A comprises: encoding, by the terminal, the first data package to be sent to obtain the first waveform data with a predetermined encoding method via the application unit; transferring, by the terminal, the first waveform data to a multi-media application interface in the application unit on a terminal operation system; and revoking, by the multi-media application interface, a low-layer hardware driver to access the audio interface.

8. The electronic signing method of claim 6, wherein a predetermined low level or high level is present at a beginning of the first waveform data in the step A.

9. The electronic signing method of claim 6, wherein:
the first data package to be sent in the step A is a base-band digital signal including instruction and message packaged with a private protocol;
the instruction comprises a signature obtaining instruction and a personal identification number verifying instruction; and
the first waveform data is obtained by encoding the base-band digital signal with a predetermined encoding method, or by modulating and encoding the base-band digital signal with a predetermined encoding method.

10. The electronic signing method of claim 6, wherein the first data package and the second data package are encrypted data packages, or, data in the first data package and the second data package are encrypted data.

11. The electronic signing method of claim 6, wherein the first data package and the second data package comprise verification values of the data.

12. The electronic signing method of claim 6, wherein the step A comprises: encoding the first data package to obtain a base-band signal waveform applicable to channel transfer and encoding the base-band signal waveform to obtain the first waveform data with a predetermined encoding method; and
before the process of encoding the base-band signal waveform to obtain the first waveform data with the predetermined encoding method, the electronic signing method further comprises: modulating the base-band signal waveform.

13. The electronic signing method of claim 6, wherein the first audio signal in the step B is an audio signal with a low-to-high transition or a high-to-low transition.

14. The electronic signing method of claim 6, wherein the step C comprises: receiving the first audio signal, recovering the first waveform data from the first audio signal, decoding the first waveform data to obtain the first data package and sending the first data package to a data processing module, by an interface module of the audio smart key device.

15. The electronic signing method of claim 6, wherein the step C comprises: receiving the first audio signal, recovering the first waveform data from the first audio signal, demodulating the first waveform data, decoding the demodulated first waveform data to obtain the first data package and sending the first data package to a data processing module, by an interface module of the audio smart key device.

16. The electronic signing method of claim 6, wherein the step D comprises: receiving and unpackaging the first data package to obtain a signature obtaining instruction and a verification value, and extracting an important data message from the signature obtaining instruction, by a data processing module of the audio smart key device; computing a verification value from data in the received first data package with a predetermined algorithm and comparing the computed verification value with the verification value from unpackaging, by the data processing module; if a match is found, determining that the received data is correct and sending the important data message to the smart key module, by the data processing module; or if a match is not found, determining that the received data is incorrect and returning an error to the terminal, by the audio smart key device.

17. The electronic signing method of claim 6, wherein the step D comprises: unpackaging the first data package by a data processing module of the audio smart key device to obtain a personal identification number verifying instruction, sending by the data processing module the personal identification number verifying instruction to the smart key module, verifying by the smart key module whether the personal identification number is correct and sending a verification result to the data processing module.

18. The electronic signing method of claim 6, wherein the signing process in the step E comprises: signing the important data message as a whole, or, extracting and signing a part of the important data message.

19. The electronic signature system of claim 3, wherein the smart key module performs the operation by: signing important data transferred from the data processing module or signing data which needs to be confirmed before signature and has been confirmed by a user, extracting critical information from the important data received from the data processing module and sending the critical information to the output module, and verifying identity data transferred from the data processing module.

* * * * *